(12) United States Patent
Zucchelli

(10) Patent No.: US 11,169,163 B2
(45) Date of Patent: Nov. 9, 2021

(54) CONSUMABLE MANIPULATION FOR THE PURPOSE OF LIQUID HANDLING

(71) Applicant: Andrew Alliance S.A., Vernier (CH)

(72) Inventor: Piero Zucchelli, Versonnex (FR)

(73) Assignee: ANDREW ALLIANCE S.A., Vernier (CH)

( * ) Notice: Subject to any disclaimer, the term of this patent is extended or adjusted under 35 U.S.C. 154(b) by 308 days.

(21) Appl. No.: 15/487,861

(22) Filed: Apr. 14, 2017

(65) Prior Publication Data
US 2017/0299619 A1     Oct. 19, 2017

Related U.S. Application Data

(60) Provisional application No. 62/322,917, filed on Apr. 15, 2016, provisional application No. 62/351,518, filed on Jun. 17, 2016.

(51) Int. Cl.
*G01N 35/04* (2006.01)
*G01N 35/10* (2006.01)
(Continued)

(52) U.S. Cl.
CPC ... *G01N 35/00732* (2013.01); *G01N 35/0099* (2013.01); *G01N 35/02* (2013.01);
(Continued)

(58) Field of Classification Search
CPC .......... B23Q 3/15; B23Q 3/152; B23Q 3/154; B23Q 3/1543; B23Q 3/1546; B23Q 2707/04; G01N 2035/0477
See application file for complete search history.

(56) References Cited

U.S. PATENT DOCUMENTS

| 4,927,545 A | 5/1990 | Roginski |
| 5,429,010 A | 7/1995 | Loehndorf et al. |

(Continued)

FOREIGN PATENT DOCUMENTS

| EP | 0601213 A1 * | 6/1994 | ......... G01N 35/1065 |
| GB | 2069974 A | 9/1981 | |

(Continued)

OTHER PUBLICATIONS

International Search Report and Written Opinion in PCT/IB2017/000515 dated Aug. 21, 2017.
(Continued)

*Primary Examiner* — Christopher Adam Hixson
*Assistant Examiner* — Michelle Adams
(74) *Attorney, Agent, or Firm* — Schmeiser, Olsen & Watts LLP

(57) ABSTRACT

A method for performing flexible liquid handling processes among a plurality of consumables includes moving consumables by at least one arm having a magnetic interface device, connecting the at least one arm from the consumables, based on magnetic attraction utilizing said magnetic interface device, and aspirating and dispensing liquids on the consumables by at least one static or quasi-static pipette. The aspiration and dispensing actions are performed without displacement of the pipettes. The method further includes sensing, by the at least one arm, magnetic presence of a matching consumable connector or magnetic vector field modified by a presence of a matching consumable connector. The method includes disconnecting the at least one arm from the consumables based on a repulsive magnetic force.

10 Claims, 9 Drawing Sheets

(51) Int. Cl.
*G01N 35/00* (2006.01)
*G01N 35/02* (2006.01)

(52) U.S. Cl.
CPC ......... *G01N 35/10* (2013.01); *G01N 35/1081* (2013.01); *B01J 2219/00364* (2013.01); *G01N 2035/0477* (2013.01)

(56) References Cited

U.S. PATENT DOCUMENTS

| | | |
|---|---|---|
| 6,323,035 B1 | 11/2001 | Kedar et al. |
| 2001/0048894 A1* | 12/2001 | Schmidt ................. G01N 35/04 422/63 |
| 2003/0089581 A1* | 5/2003 | Thompson ......... B65G 47/1485 198/619 |
| 2004/0164571 A1* | 8/2004 | Pedrazzini ................ B01L 9/50 294/65.5 |
| 2006/0039822 A1 | 2/2006 | Domack |
| 2013/0280143 A1* | 10/2013 | Zucchelli ........... G01N 35/0099 422/501 |
| 2014/0106386 A1 | 4/2014 | Umeno et al. |
| 2015/0127157 A1 | 5/2015 | Matsukuma |

FOREIGN PATENT DOCUMENTS

| | | |
|---|---|---|
| JP | 2008510993 A | 4/2008 |
| JP | 2012117878 A | 6/2012 |
| JP | 2015085490 A | 5/2015 |

OTHER PUBLICATIONS

International Preliminary Report on Patentability in PCT/IB2017/000515 dated Oct. 25, 2018.

* cited by examiner

CONSUMABLE MANIPULATION FOR THE PURPOSE OF LIQUID HANDLING

FIELD OF THE INVENTION

The present disclosure relates to the field of automation of chemical, biological and biochemical process or reaction. More specifically, it discloses device and methods for performing liquid handling by means of manipulating consumables among static pipetting stations.

BACKGROUND OF THE INVENTION

The liquid handling process is of great importance in the field of biology, biochemistry and chemistry for the execution of experiments, in particular in-vitro.

In general, we define as "liquid hander" or "liquid handling device" any device capable of aspirating a sample from a source consumable and dispensing the same sample (or aliquot) into a destination consumable. In particular, we identify as generic liquid handler those systems designed to perform liquid handling—as defined above—among a wide variety of consumables, typically identified and configured by the liquid handling users. Some examples of generic liquid handlers are the Beckman Coulter Biomek, the TECAN Evo, the Qiagen Qiacube, the Andrew Alliance Andrew robot, a mechanical manual pipette, or an electronic liquid handling pipette. All existing liquid handlers can be characterized by a bench space, where the consumables sit, and a "liquid handling head" that transports the samples from one or a plurality of source consumable to one or a plurality of destination consumables. In the examples above, a manual pipette (or a part of it) can be considered both a liquid handler or a liquid handling head (the user and the laboratory bench being part of the liquid handler definition too). More narrowly, we define a flexible liquid handler to be a liquid handling apparatus designed to serve liquid handling steps that are not rigidly predefined, and may change from time to time in sequence, or order, or length, or among consumables that are not strictly predefined. The processes performed by a flexible liquid handler are defined to be flexible liquid handling processes.

In particular, we define as "consumable" any container of liquids or suspensions, for example—but not limited to—tubes, microtubes, vacutainers, tube arrays, microplates of all sizes, microchips, petri dishes, strips and similar. More specifically, we define as "tip" a specific consumable that can be physically attached to a liquid handling head and that's designed for the temporary storage of liquid between the steps of aspiration and dispensing. A tip for liquid handling is generally intended as removable or permanent interface between the fluid and the liquid handling device. In a specific implementation, the tip can be meant to contain the fluid aspirated and dispensed by the liquid handler. Tips can be considered as disposable tips when they are used a single time (normally to prevent contamination) and when they can be reused multiple times (permanent tips). Tips are typically characterized by a lower bore, allowing to aspirate the sample from its open surface, and dispense the collected liquid through the same orifice. Liquids are kept inside the tip, during the two steps, by retention of the liquid into the tip through the action of an under pressure over one liquid surface and the exploitation of the liquid viscosity and surface tension properties.

Since liquid handling is one of the most repetitive and widespread activities in the life science and diagnostic field, any improvement in liquid handling method has a significant impact in the industry activities and can result in significant costs savings and quality improvements. For example, the action of transporting a sample from one consumable to another consumable exposes the risk of losses of sample during the transportation, since the aspiration and dispensing device maybe optimally designed for the purpose of aspirating and dispensing but not for the purpose of isolating the sample during transportation: that's the case of a plastic tip with a bore at the bottom. In some cases, for example in molecular biology applications before polymerase chain reaction (PCR) amplification, a loss of an individual molecule during the transportation may have the consequence of samples contamination: in some applications (for example, in forensics) consequences may be catastrophic.

Also, the sophistication and complexity of pipetting heads has significantly increased over time: some heads may include 8, 12, 16, 96, or 384 simultaneous aspirations and dispensing channels, operating synchronously or independently. Such heads become significantly heavy, so that the precise and rapid movement of such a head over consumables may pose significant challenges in the mechanical structure, that has to be sized and dimensioned accordingly.

The increasingly large number of channels in liquid handlers, additionally, multiplies the risk of sample contaminations. Since liquid handlers typically aspirate and dispense liquid from their top surface in contact with air, they have an exposed orifice in their bottom region: as a consequence, the possibility of dripping liquids, dispersion of aerosols and vapors cannot be excluded.

SUMMARY OF THE INVENTION

We define as "docking" the action of physically connecting or disconnecting from an object. Docking can be achieved through mechanical means or through non-material means, for example by the action of a force field.

In one aspect of the present disclosure, we provide a method and device to perform liquid handling by means of manipulation and transportation of consumables, instead of manipulation and transportation of a liquid handling head, among static or quasi-static liquid handling heads. A quasi-static liquid handling head (or pipette) is defined as a pipette that doesn't move between the aspiration and dispensing steps. A static pipette is more strictly defined as a pipette that never moves, for example doesn't move also during the operations of tip insertion or replacement.

In another aspect of the present invention, the liquid handling is performed by the transportation of individual and disconnected consumables or tips by means of a robotic arm to and from a static or quasi-static liquid handling head.

In another aspect of the present disclosure, the liquid handling is performed by the transportation of consumables for the purpose of expandable liquid handling operations.

In another aspect of the present disclosure, the liquid handling is performed by the transportation of consumables by means of a robotic arm for the purpose of serviceability. In fact, independently of the apparatus size it's always possible to service the arm individually.

In another aspect of the present disclosure, we present a robotic arm manipulating consumables for the purpose of liquid handling that can be integrated into a standard laboratory bench for reasons of easier laboratory integration.

In another aspect of the present disclosure, we introduce a plurality of arms capable of manipulating consumables and feed static or quasi-static pipetting heads with the purpose of improving liquid handling performances with respect to the same moving pipetting-head.

In another aspect of the present disclosure, we introduce a method for exploiting a cache area for consumables with the purpose of improving the liquid handling performances of a consumable-manipulating arm.

In yet another aspect of the present disclosure, the area for storing consumable in a permanent or temporary way is temperature controlled, and it determines the temperature of the sample-containing consumables during the liquid handling operation by consumable transportation.

In yet another aspect of the present disclosure, we introduce a storage device for consumables that's organized in a vertical array of locations that are frontally accessible, for the purpose of minimizing the footprint of the apparatus containing one or a plurality of consumable-moving arms utilized for the purpose of liquid handling.

In yet another aspect of the present disclosure, we introduce a design for automatically openable and stackable tip boxes for the purpose of continued liquid handling operations with a consumable moving device designed for the purpose of liquid handling.

In yet another aspect of the present disclosure, the consumable-moving arm with the purpose of liquid handling is characterized by a magnetic docking connector capable of fast and vibration-free operations, avoiding the spill out of liquids.

In yet another aspect of the present disclosure, the consumable-moving arm has a magnetic docking connector that's designed to sense the magnetic presence of the matching consumable connector and actively modifies the magnetic field for an optimal docking.

In yet another aspect of the present disclosure, the consumable-moving arm has a magnetic docking connector that's designed to sense the magnetic vector field modified by the presence of the matching consumable connector for the purpose of localizing with accuracy its location.

In yet another aspect of the present disclosure, we disclose a method to identify the location of an object through the analysis of images and the identification of the object by means of a color (Hue) analysis.

In yet another aspect of the present disclosure, we disclose a docking connector designed with a specific color to differentiate from the environment on the basis of its specific color hue.

In yet another aspect of the present disclosure, we disclose a device to tag a consumable identity by means of a barcode tag readable from a top and a side position.

In yet another aspect of the present disclosure, we disclose an inflatable sleeve around a robotic arm to protect operators from corporal damage.

In yet another aspect of the present disclosure, we disclose an inflatable sleeve around a robotic arm for the purpose of avoiding contamination into the arm.

In yet another aspect of the present disclosure, we disclosed a robotic arm for the manipulation of consumables for the purpose of liquid-handling, wherein a camera mounted on the arm is used for the localization and identification of consumables and for the purpose of service and support activities.

In yet another aspect of the present disclosure, we disclose a liquid handling device wherein the positioning of the source consumable or the destination consumable below the liquid handling head is performed by means of an external arm.

In yet another aspect of the present disclosure, we disclose a liquid handling device wherein the positioning of the source consumable or the destination consumable in a suitable and desired space point is performed by means of an external robotic arm.

In yet another aspect of the present disclosure, we disclose a liquid handling device wherein in-tip quality control during liquid handling is performed by a static camera.

In yet another aspect of the present disclosure, we disclose a capping or decapping device for tubes wherein the tube is manipulated by an external robotic arm and the cap is manipulated by the device.

In yet another aspect of the present disclosure, we disclose a device to apply or remove a cover onto a microplate, wherein the microplate is manipulated by an external robotic arm and the cover is manipulated by the device.

In yet another aspect of the present disclosure, we disclose a device to detect the liquid level of a sample inside a consumable, wherein the consumable is manipulated by an external robotic arm and the liquid level is determined on the basis of the spatial position of the consumable.

In yet another aspect of the present disclosure, we disclose a device to identify a consumable, wherein the consumable is manipulated by an external robotic arm and identification occurs through static camera images of a fixed spatial volume.

In yet another aspect of the present disclosure, we disclosed a method where environmental parameters like temperature or humidity inside the liquid handling station are regulated in order to achieve the optimal liquid handling performances.

In yet another aspect of the present disclosure, we disclose the use of imaging inside the liquid handling station as a method to detect incorrect insertions or damaged or flawed tips.

In yet another aspect of the present disclosure, we disclose the method of tilting consumables by means of a robotic arm for the purpose of optimal aspiration and dispensing of liquids or for minimizing interference with materials inside the liquid volume.

In yet another aspect of the present disclosure, we disclose a method in a system where consumables are manipulated for the purpose of liquid handling where the agitation of liquid is achieved by movement of the consumables by means of the consumable manipulating arm In yet another aspect of the present disclosure we disclose a method where agitation of liquid contained in a consumable handled by a robotic arm is achieved by means of movement of the consumable in contact with a vibrating head, where the vibrating head force on the consumables equals or exceeds the force of the robotic arm.

DETAILED DESCRIPTION OF THE INVENTION

The method of introducing an inversion in the liquid handling process, where consumables are displaced and transported instead of liquid handling heads, is an innovative solution in terms of workflow. In particular, modern biological and biochemical assays are performed in increasingly smaller volumes, for the primary reason of reducing the amount of samples required and for the reduction of costs. Therefore, the weight of samples has decreased over time, and most of the biological experiments and samples are nowadays in the weight range below 50 g, and almost systematically below 200 grams.

Figure 1:
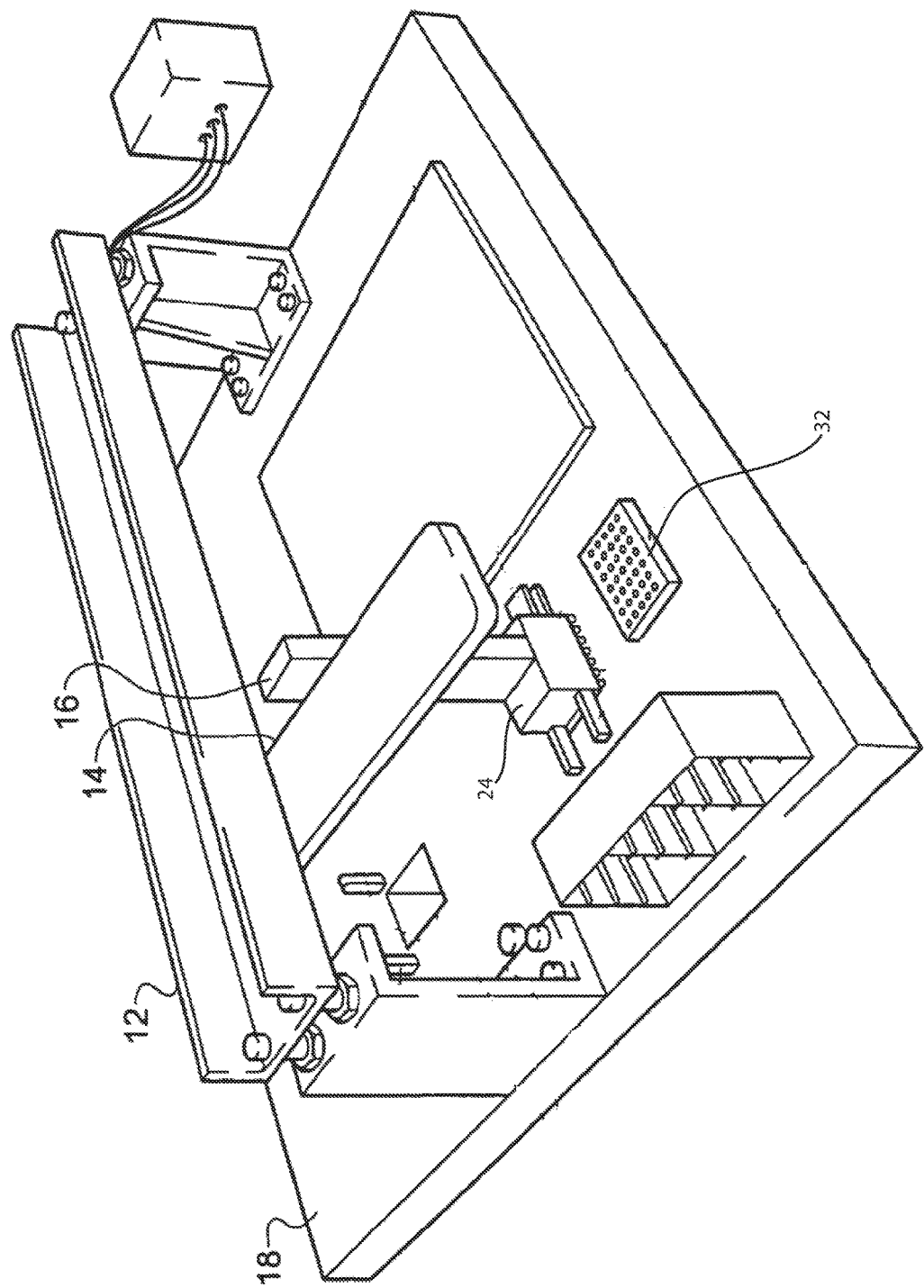
FIG. 1 shows a schematic liquid handler as it is implemented today.

Considering also the trend in replacing glassware with plastic-ware, that has a lower density, we can observe a significant reduction of consumables and samples weight with respect to the liquid handling solution. On the contrary, the liquid handling heads are systematically increasing in weight, with the requirement of an increasing accuracy: therefore, the liquid handling devices moving heavy liquid handling heads have become more and more bulky, with mechanical structures weighting various tens or even hundreds of kilograms and therefore extremely expensive. FIG. 1 shows an example of liquid handler device: the pipetting head indicated as 24 translates in the space through linear axes 16, 14 and 12 above a space 18 containing consumables. The consumable 32 can be flexibility accessed for aspiration and dispensing by the head 24 for the purpose of liquid handling.

Figure 2:
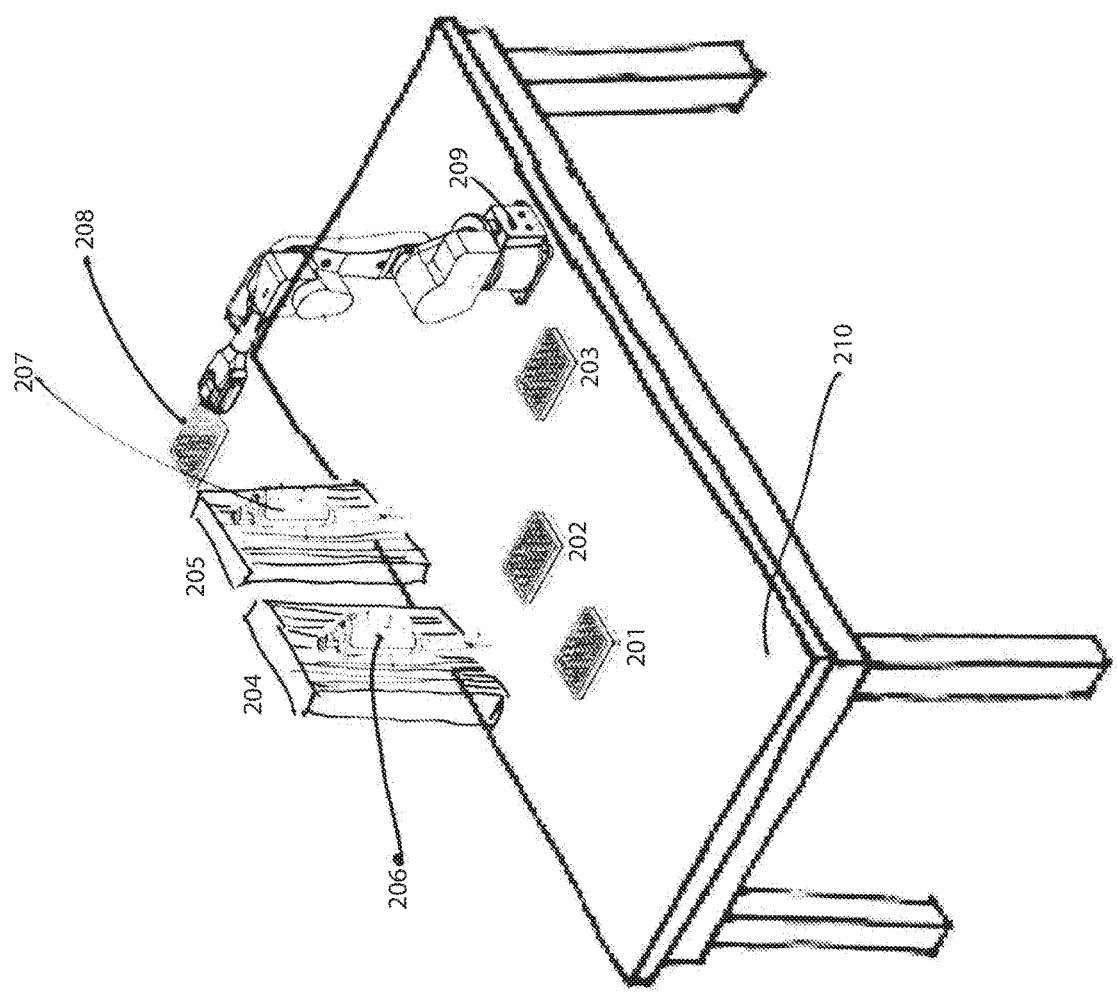
FIG. 2 shows an example of a system manipulating consumables for the purpose of liquid handling.

According to the present disclosure, in reference to FIG. 2, a light mechanical arm 209 sitting on table 210 is designed for the purpose of moving light consumables, like consumables 201, 202, 203, 208 and similar: the low consumable mass reflects in a lower inertia, therefore faster accelerations, and above all in a significant reduction of the cost of the mechanical solutions in the arm 209 that allows achieving a certain speed of typical trajectories. The pipetting heads—required for the operation of aspirating and dispensing—become on the contrary significantly simpler too: removing the need of displacement, they can be designed with less constraints. In particular, standard electronic or mechanical pipettes, single or multi-channel, can be exploited as in pipettes 206, 207, resulting in an additional reduction of design and manufacturing costs. The pipettes can be either completely static or quasi-static in one or a plurality of stations 204 and 205: in the second case, some minor and simple movements can be integrated in the pipetting station without requiring its translation in a three-dimensional space. For example, a simple tip-ejection mechanism can be integrated whenever required, or a vertical movement among two fixed positions to allow for tip insertion. The vertical movement for tip insertion could be alternatively integrated below the pipette 206 and 207, for example by means of a lifting table sitting just below the tip rack. In fact, tip insertion may require applying a force that is above the design possibilities of the arm: so it may become convenient to implement the tip insertion functionality inside the pipetting station itself. Obviously, the liquid handling functionality of the arm 209 is complemented by other functionality that makes the system more useful and productive than a conventional liquid handler: for example, consumables 201, 202, 203 could be stored in a stack format, and the arm could also take care in throwing them away into a dedicate waste when required.

In yet another aspect of the present disclosure, the consumables can be moved to and from the pipetting stations in assemblies or individually: in the first case, the possibility of parallel operation allows an increased throughput; in the second case, it may be convenient to achieve a larger flexibility in directing the process towards specific samples in an independent manner.

In yet a further aspect of the present disclosure, the use of a robotic arm moving consumables can be exploited to achieve the double functionality of liquid handling and of a more extended workflow. For example, the system could access stacks of consumables, and use them serially in a way that a moving liquid handling hand could not achieve, since in a stack only the topmost consumable can be accessed by a liquid handling device. A robotic arm moving consumables can achieve liquid handling operations and can, simultaneously or in a serialized manner, achieve the functionality of feeding the consumables onto a next step of the process, for example a microplate reader or a mass spectrometer, or in alternative be fed from another arm that performs a previous liquid handling step in a pipeline optimized for individuals steps. The possibility of a pipeline of arms moving consumables for the purpose of liquid handling doesn't exist for conventional liquid handlers that move around the liquid handling heads, that would otherwise require operator time or additional automated solutions for the coordination of the workflow. In this sense, an arm moving consumables for the purpose of liquid handling can be considered a more expandable solution with respect to a conventional liquid handler.

Another advantage in a light arm moving consumables consists in the fact that, due to its more modest engineering requirements and weight-optimized design, the system is more serviceable than a conventional liquid handler. In particular, the arm could be detachable from the operational table and it could be easily shipped for a more efficient service and support model. Because of the high costs in service and support, this aspect constitutes a strategic advantage for a light consumable moving arm against a conventional liquid handler system displacing heavy pipetting heads.

In yet another aspect of the present disclosure, the robotic arm is fixed onto a standard laboratory bench: in this configuration, the adoption of a new liquid handler doesn't require a complex infrastructure modification, reducing further the costs and making its adoption easier.

In another implementation of the present disclosure, a system can exploit or being upgraded to a dual or triple arm configuration (and even more when required). Whenever more than one arm operates onto the same liquid handling station, a new, interesting advantage emerges with respect to conventional liquid handlers. In a conventional liquid handler where the pipetting head moves with respect to consumables that don't move with respect to each other, the trajectories of the pipetting head among the source, the destination and the tip racks cannot be optimized for all consumables and above all they are performed serially by the pipetting head. In a configuration where two or more arms operate on the same process, the arm collecting the tips may differ from the arm collecting the source consumable or from the arm collecting the destination. In such a way, multiple movements can occur concurrently, parallelizing the process and minimizing the time losses.

In particular, we highlight that the typical sequence of operations for a liquid handling head (also called cycle)

consists in the positioning above tips, insertion of tips, positioning above source, aspiration of source, positioning above destination, dispensing into destination, positioning above tip waste, and ejection of tips. The same cycle in a single arm assembly consists in the connection with the tips, positioning the tips into the liquid handling station, dropping of tips, connection with source, positioning of source into the liquid handling station, dropping of source, connection with destination, positioning of destination into the liquid handling station, connection with waste collector (or the same tip rack), positioning of waste collector into the waste (and ejection).

Apart from the number of steps, that's arbitrarily defined, what matters is obviously the overall time taken by each step, and arguably the movement of a light object is faster than moving larger and more complex devices (including the connection vacuum lines, compressed air or electrical contacts). Importantly, the same sequence with two arms (called A and B for example) profits of a significant parallelism: A connects with tips while B connects with source, A and B move towards the pipetting station and A inserts the tips, A takes back the tips while B moves the source inside the pipetting station, while the pipetting station aspirates A collects the destination, while A drops the source B inserts the destination into the pipetting station, while the pipetting station aspirates A connects with the waste collector, while B drops the tips A moves the waste collector inside the pipetting station, while A moves the waste collector moves inside the waste arm B connects to the tips. The efficiency becomes even better when three arms (labelled A, B, C) are present: A collects the source while B collects the destination and C collects the tips: from now on, all movements are minimized to the minimum distances that are allowed to avoid collisions, achieving the configuration where the liquid handling station behaves in the fastest way possible for a compact and high-speed liquid handler.

Even the overlap with the next pipetting action can start while the action is still ongoing, since the arm A carrying the source is free to dock to the next source while the ongoing operation is being finished by arms B and C. Also, consumables don't have necessarily to go back to their original location if it would not be optimally positioned with respect to the liquid handling station. This key advantage is present in multiple and single arm operations, allowing for example the creation of cache areas (or volumes in space) around a certain liquid handling station of interest where consumables can be stored temporarily for the duration of a critical operation, allowing to mimic the behavior of a processor when its instructions are cached in a local, fast memory for easier retrieval. The space and size of cache areas can be optimized according to the physical space available, and the operations scheduling can be efficiently organized through simulation software that can optimize the trajectories, location and movements in view of the actual process being executed.

For example, there could be location A, B, C to be optimally ranked in the same order for efficient access to a certain pipetting station: a consumable that need to access the same pipetting station multiple times, could be allocated to position A with preference, and if position A is already taken it could move to position B, or to position C if position B is taken too. Similar spatial optimization can be performed for the permanent or temporary storage of consumables and reagents in areas with a desired temperature, for example heated or cooled with respect to the room temperature. So, an arm moving consumables for the purpose of liquid handling can simultaneously set the temperature of certain consumables during the process, by simply directing them to the surface or volume known to be of the desired temperature. The same goes for other physical fields like UV irradiation, aspiration flow, radiation irradiation or radiation confinement.

Another benefit of a light arm moving light consumables with respect to a conventional liquid handler structure is that, as a consequence of the light arm design, its reach could be exploited in a more general and productive way. In particular, consumables can now be stored in configurations that were not possible if the consumables would have to be ready for liquid handling processing. So, consumables can be stored in stacks in a LIFO configuration, or in vertical racks where the consumables are not accessible for the liquid handling purpose (a pipetting head needs to access the open surface of the liquid) but are however accessible by an arm designed to move consumables. So, the consumables can be stored in racks with front access, at a much higher density and with lower laboratory occupation than in a conventional liquid handler apparatus.

In a further aspect of the resent disclosure, tip racks can be manipulated by the same consumable moving arm adopted for liquid handling. In this approach, another key issue in accessing tips is solved: in a conventional liquid handler, tips have to be opened and made accessible to the liquid handling head before all operations start. In this case, the method of moving consumables could be exploited specifically to move the tip box cover separately from the tips themselves, allowing for preservation of the tips in sterile conditions up to the moment they are actually exploited for the liquid handling operations. This feature is a significant improvement for a given protocol, and further expands the possibility of a liquid handler device based on the movement of consumables since it allows for even longer protocols to be executed, something that would result in contamination otherwise.

In another aspect of the present disclosure, it is realized that a key feature of a liquid handler based on the movement of consumables consists in a fast docking operations. In fact, docking is not present in a standard liquid handler, and its slow execution would imply a loss of competitive advantage. Also, we understand it may be undesirable to induce vibrations and abrupt movements of a liquid-containing consumable, since they could result into a partial or full spillover of liquid resulting in contaminations and loss of material. Therefore, according to the disclosure a docking connector is configured composed of two matching halves, conventionally called female and male docking connectors, where the connection between the two halves is achieved by means of a magnetic force. We consider the magnetic force more suitable to other solutions, like electrostatic forces or mechanical forces, for a number of reasons. First, the magnetic force can be both attractive and repulsive, allowing the arm to capture the corresponding connector from a distance and also detach from the corresponding connector by means of a repulsive force that may anticipate the arm detachment trajectory. Additionally, it's within the scope of the disclosure to have no moving parts, allowing the containment of the cost of the connectors and improving their lifetime and reliability. Additionally, it's further within the scope of the disclosure that the presence of the mating connector can be achieved by means of magnetic field sensing, for example by means of simple hall sensors and or tri-axis sensors that don't imply a mechanical connector or electrical contact.

Also, the presence of a magnetic field perturbation can be sensed by a suitable sensor or induction, and exploited for the modulation of a magnetic force to control and master the docking process. For example, an excessive docking acceleration can be avoided by modulating the magnetic force through the sensing of the docking attitude, and the modulation of one of the involved fields through the modulation of an electric current or the displacement of a magnet. However, the sensing of the magnetic field vector (e.g. its direction and its force) could be also exploited for the simple sensing of the relative position (and attitude) of the consumable with respect to the arm dock connector.

Magnetic sensing can greatly exploit short range localization of a consumable, however it's not as effective as soon as many consumables are within the sensing range, or in general where the sensing range is very large (implying a high magnetic sensitivity that could be affected by the earth magnetic field). Therefore, for long range identification of consumables in an arm designed to move consumables for the purpose of liquid handling operations we may prefer exploiting camera imaging and similar techniques. Through camera imaging, a docking connector can be identified, uniquely or non-uniquely by means of barcodes. From a large distance, the identification of the barcode may result to be difficult according to the resolution of the camera sensor or of the corresponding optics.

In a further aspect of the present disclosure it is within the scope of the disclosure that possible magnetic and barcode identification by means of color identification of the connectors, exploiting a color hue that is characteristic of the connectors and is not common in the surrounding environment. Similarly, to Chroma Key technologies, an arm moving consumables for the purpose of liquid handling may exploit blue or green docking connectors in order to localize them from a distance, by easy detection of their existence, followed for example by an approach allowing to zoom the camera to a distance where the barcode can be read (and therefore the consumable can be uniquely identified), and followed by a short range docking trajectory guided in two or three dimensions by the magnetic field configuration. In a further illustrative implementation according to the disclosure, two colors can be exploited in order to detect from a distance their orientation or their height, for example by having a top horizontal surface in one color hue and a vertical front surface in a different color hue, both of them easily distinguishable from the environment.

In another aspect of the present disclosure, suitably configured barcode is connected to the docking connector associated to the consumable in order to be visible from at least two directions, for example from the front and from the top. This barcode could be simply duplicated, and/or positioned at a 45 degrees' angle allowing to have an equivalent projected surface to the top and to a front view. As an obvious possibility, but not limited to that, a linear barcode would make any projective correction unnecessary.

In yet another aspect of the present disclosure, an arm is suitably designed to operate in a collaborative environment. Despite its limited mass that allows using limited forces to achieve a substantial acceleration, there are situations where the operator could be harmed or affected by the arm itself, and for example finger pinching in an arm joint (or between arm joints moving near to each other) is undesirable. In another aspect of the present disclosure, we intend exploiting an inflatable sleeve (or a sleeve containing light foam) in order to make the space among joints less accessible to a user. In yet another aspect, such an inflatable sleeve may serve for preventing substantial contamination to the arm by means of the reagents displaced by the arm for the purpose of liquid handling.

In a future aspect of the present disclosure, a liquid handling station where the positioning of the source or destination below the liquid handling head is performed by means of an external robotic arm, physically disconnected from the liquid handling station is contemplated. For example, the liquid handling head can still move vertically in order to sip to and from the samples, but the choice of the samples and the precise location in the horizontal plane is external. In yet another aspect of the present disclosure, the external arm localizes completely the consumable with respect to the liquid handling head, including its vertical position or its dynamics, for example lifting the source during aspiration in order to maintain a constant penetrating of the tip below the liquid level surface.

In further aspect of the present disclosure, we disclose a liquid handling station where, according to the nature of the consumable-moving arm and the static or quasi-static nature of the liquid handling head, a static camera is observing and monitoring the tip during the insertion or the aspiration or the dispensing or the steps in between. The static camera monitoring allows for quality control of the tip insertion, liquid aspiration, volumetric information, bubble detection capabilities, and liquid ejection. A static camera may be complemented by a static photometer or other optical and electromagnetic device capable of extracting information from the liquid containing tip.

In another aspect of the present disclosure, a capping and uncapping device exploiting the functionality of the robotic arm is designed to move consumables for the purpose of liquid handling, where the tube is manipulated by the arm and the cap is manipulated by the capping and uncapping device. In particular, the device could be limited in grabbing and rotating the cap, in coordination with the arm. The cap could be either kept in the grabber during operations, or simply dropped from the system in a suitable waste.

In yet another aspect of the present disclosure, a liquid level detector that essentially measures the distance from a consumable that is manipulated by a robotic arm designed for liquid handling, and the knowledge of the arm geometry allows determining the liquid level position for further liquid handling operations is contemplated.

In a further aspect of the present disclosure, the consumable identification occurs by transportation of a consumable from the robotic arm into a region of interest, where cameras capture static images in a fixed spatial volume, and images of the consumable its labels, its barcode and other identifiers all partially or completely contribute to the identification of the reagent or reagents contained therein.

In yet another aspect of the present disclosure, it is envisioned within the scope of the disclosure that a method of using the device according to the disclosure wherein environmental parameters like temperature or humidity (but many other physical properties could be included, like acoustic resonant waves and or a vibration of the pipette holding structure) inside the liquid handling station are regulated in order to achieve the optimal liquid handling performances. In particular, it is well known in the art that the temperature of the environment and of the air in contact with the pipette or the tip assembly do affect the liquid handling performances. The advantages of a static or quasi-static pipetting station consist in the fact that the pipetting action occur in small and spatially localized environment, that is therefore easier to control in terms of temperature and humidity, for example. Also the station could be partially closed when not in use, allowing the thermalize and stabilize the local atmosphere, for example by means of a piezoelectric humidifier for increasing locally the air humidity (therefore reducing evaporation) and/or a Peltier cell for thermalization.

In a further aspect of the present disclosure, the use of imaging inside the liquid handling station it is contemplated as a method to detect incorrect insertions or damaged or flawed tips. The advantage of a static or quasi static pipetting station consists in the fact that cameras are simply fixed onto the structure of the station, and therefore are static devices imaging a static region of space. This minimizes the need of moving cables, variable focus and unnecessary complication in the implementation, making the use of a low-cost camera convenient for applications that would not be economical convenient if the camera would have to move around together with the pipetting head. In particular, the camera can be exploited for the purpose of quality control in the process, for example identifying those tips that would not be inserted correctly (by measuring their position and through image recognition means), and including possible defects that may be visually recognizable.

In yet another aspect of the present it is contemplated that, a method of tilting consumables by means of a robotic arm for the purpose of optimal aspiration and dispensing of liquids or for minimizing interference with materials inside the liquid volume is disclosed. By tilting it is intended that any movement designed to orient the consumable in space, combined or not combined with other translations that may render the trajectory of the tip vector an arbitrary connected and continuous trajectory for its position and orientation in space (including not derivable trajectories).

The purpose of tilting consumables is multi-fold. For example, when liquid is dispensed it is often beneficial to perform the so called tip touch-off on the side of the consumable. Touching the side of the consumable with the tip is a well-known technique in the art that is applied by manual operators, and is never applied by liquid handlers since they cannot easily tilt the pipetting heads and manipulate them with correct trajectories. In a system manipulating consumables for the purpose of liquid handling, this operation is very natural, so the dispensing of liquid may start at the center of the consumables, follow vertically the evolution of the liquid level during dispensing to minimize the wetting of the tip external walls, and finally exit from the liquid while adopting a trajectory that puts in contact the distal end of the tip against the wall of the consumables.

This method according to the disclosure allows for complete evacuation of the liquid that may stay connected to the tip according to its surface tension properties and the tip affinity for the liquid. In another aspect, the tilting may be used in aspiration, for the obvious purpose of exploiting gravity and confining the liquid into regions of the consumable that may be more suitable for aspiration, and in particular for complete or improved evacuation of the liquid for the purpose, for example, of minimizing dead volume (e.g. liquid losses in the process). In another example, tilting may guarantee that material, for example adhesion cells sitting at the bottom of a consumable, are not affected by the tip presence but, at the same time, liquid aspiration or dispensing can occur effectively, both for the purpose of accurate dispensing or for the purpose of thorough evacuation of the liquid (without again perturbing the material).

In a further aspect of the present disclosure, a method in a system where consumables are manipulated for the purpose of liquid handling where the agitation of liquid is achieved by motion of the consumables by means of the consumable manipulating arm is disclosed. In one implementation, the arm trajectory can have the simple purpose of effectuating mixing of the liquid. By agitation we include a broad set of operation that may be designed to have a homogeneous mixture of two or more liquid, but could also for example meant for distributing and homogenizing liquids above certain materials like beads or cells or bacteria, or for example releasing or capturing gases like in the process performed by wine tasters for the release of wine flavor, or for example to achieve a rapid vibration like a vortex, or for example including the inclusion of gas bubbles inside the liquid and or foaming operations, or for example maintain a slurry mixture in the liquid form like with concrete or eutectic and non-Newtonian liquid. The trajectory can be a simple translation in space or generic tilting as described above, and could also have the purpose of inducing sedimentation into a specific region of the consumable.

In another aspect of the present disclosure a method is disclosed where agitation of a liquid contained in a consumables handled by a robotic arm is achieved by means of movement of the consumable in contact with a vibrating head, where the vibrating head force on the consumable equals or exceeds the force of the robotic arm. The vibrating head could be a rubber ball, for example, that moves in an elliptic direction: when the consumable held by the robotic arm comes in contact with the head, the movement is transferred to the consumable, and the force applied on it can exceed the holding force of the arm and of the connector connecting the consumable to the arm. This results in consumable motion, that can be exploited for the purpose of agitation.

Figure 3:
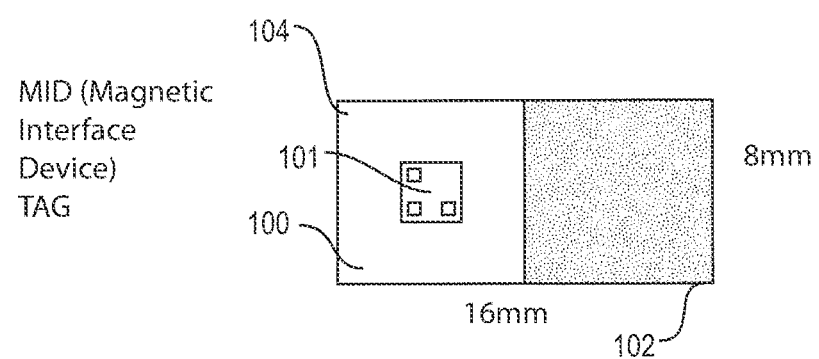
FIG. 3 shows an example of a possible MID Connector.

In FIG. 3 it is disclosed an implementation of the Magnetic Interface Device (MID). The purpose of the system is to rapidly and effectively connect and disconnect, without interference, to static objects by means of a magnetic field, modulated in various ways (mechanically or electrically). This operation is also called docking.

The magnetic connector is composed by two moieties, the tag connected to the object to be moved around and the hand connected to the moving am.

The tag 100 is typically a metallic object (iron, steel or similar) with magnetic properties. Typical dimensions of a tag are between 1 mm and 100 mm, but in some applications designed for the purpose of liquid handling are typically of the order of 10 mm. the shape may be square, round rectangular or similar, dictated by cost reasons. The tag may contain a region 102 containing user readable (or writeable) information, for example a paper label, and a region 104 containing a 2D or 1D barcode 101. The region 104 preferably exposes the naked metal, and a flat region to be used for docking purposes against the hand. It is understood that the tag is preferentially rigid, for example a 8×16×1 mm rectangular steel tag. The 2D barcode 101 and similar information can be engraved onto the tag by means of laser ablation or similar.

Figure 4:
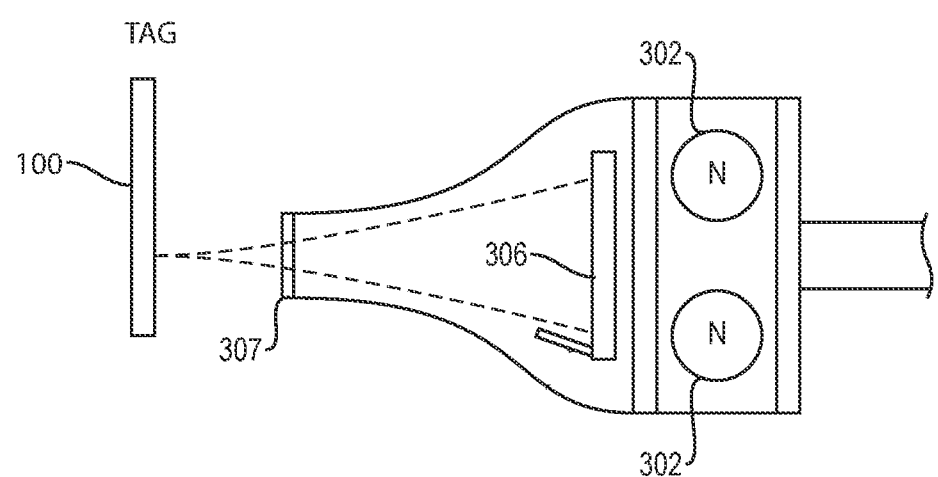
FIG. 4. Depicts a component of a Magnetic Interface Device.
Figure 5:
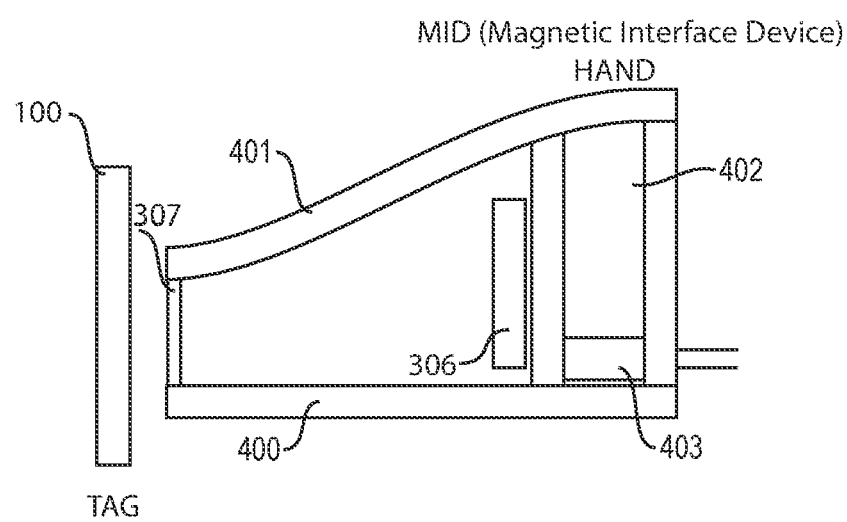
FIG. 5 Depicts a further component of a Magnetic Interface Device.

The tag 100 connects to the hand by means of its front surface, that's flat to avoid the occurrence of interference during docking. As shown in FIG. 4 a side view of tag 100 is shown. As further shown in FIG. 5 a side view of the tag 100 is shown. In FIGS. 4 and 5 the hand is designed for a flat connection in region 307. As depicted in FIG. 5, metallic slabs 401 and 400 act as magnetic guides of the magnetic field generated by coils 302, as depicted in FIG. 4. The coils 302 can be composed by two parts, as shown in FIG. 5 displayed as 402 and 403: one electro-coil 402 and a permanent magnet 403. Such configuration is desirable whenever the system has to remain in a hold state of tag 100 while current is not flowing in the coils, for example during a power cut. The attraction force of the hand against the tag 100 is modulated by the current flowing in the coils, for example modulated as pulse-width modulation (PWM) by an external controller connected to the other functional part of the system here described or eternal to the system.

Additionally, the coils may be complemented by a hall sensor measuring the magnetic field, or current sensing means, capable of detecting variations of the magnetic flux in the circuit for example induced by the presence of tag 100 in the field generated by the magnetic elements of the hand. Such a method could also allow to detect the tag position with respect to the hand, for example. The magnetic system composed by the hand and the tag therefore allows to connect, at a desired force and at a desired moment, the hand to the tag. Its modulation over time, could further allow for soft docking or simple approach, for example moving the object connected to the tag with necessarily creating a tight and rigid connection among the two. A large magnetic field will obviously generate a large force, that may create a rigid connection between the object and the hand.

Figure 6:
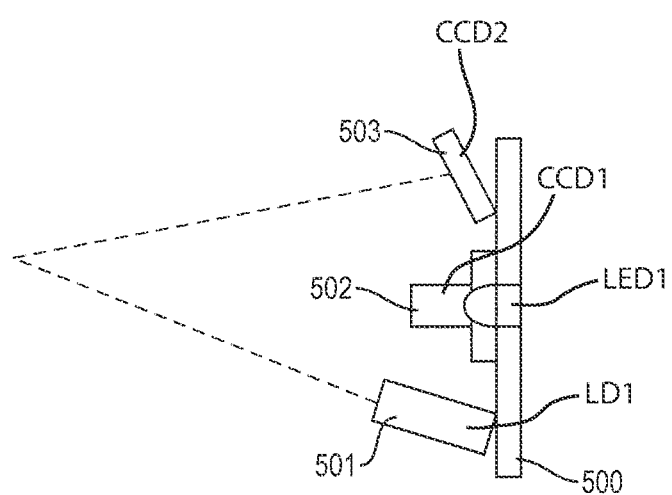
FIG. 6 Depicts an additional component of a Magnetic Interface Device.
Figure 7:
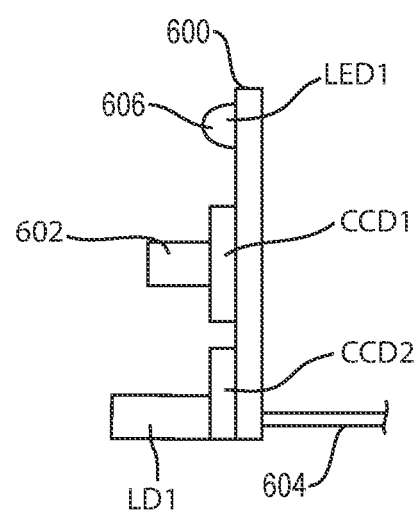
FIG. 7 Depicts an additional component of a Magnetic Interface Device.

If such a system can create a connection between the tag and the hand easily controlled and without moving parts, the magnetic feedback from hall sensors or currents cannot provide detailed information of the relative positions during docking. For the purpose, an optical system 306 is introduced, as shown in FIG. 4. The optical system 306 collects information from the tag 100 by means of light and its reflection. Two exemplary optical systems 306 are shown in FIGS. 6 and 7. In particular as shown in FIG. 7, as an LED source 606 (LED1) mounted on a printed circuit board (PCB) 600, and in FIG. 6 as a laser diode 501 (LD1), for example mounted on printed circuit board (PCB) 500. The exemplary PCBs inside the hand create light used for obtaining different information. In both embodiments, the PCB 500 and/or 600 is connected to additional hardware through cable 604, (as shown in FIG. 7), in order to provide the necessary electrical power and to process additional information.

Figure 8:
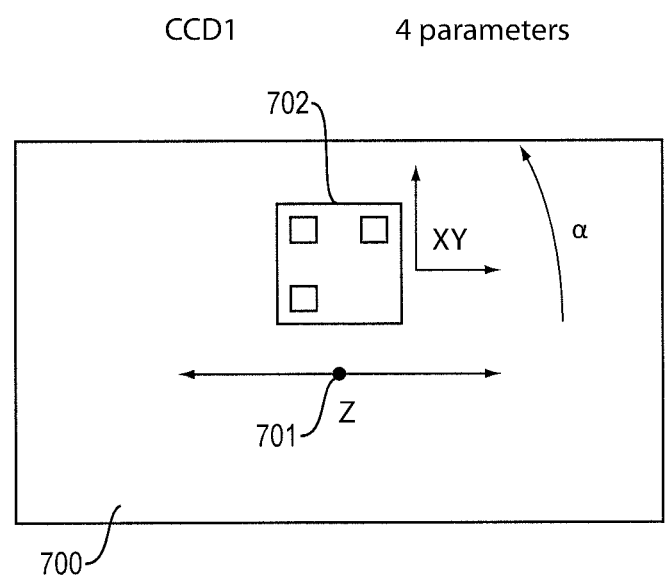
FIG. 8 Depicts an image of the laser diode spot in the field of view of camera.

As further shown in FIG. 7 a light source 606 is for example an led illuminating through the aperture between slabs 401, 400, as shown in FIG. 5 in a diffusive way, allowing a camera 602 (a charge coupled device CCD1, equipped with a lens or a pinhole) to image tag 100 (and in particular barcode 101). Turning to FIG. 6, the purpose of laser diode 501 is different: it projects an approximately circular dot on tag 100 (typically in region 104 but outside barcode 101) that is imaged by camera 502 in position 701 as depicted in FIG. 8. Either because of a small angle between the camera axis and the laser diode axis, or because of simple parallelism, the position of the image of the dot in the field of view of camera 502 contains information about the distance of tag 100 from camera 502, and therefore from the hand and the contact area.

Figure 9:
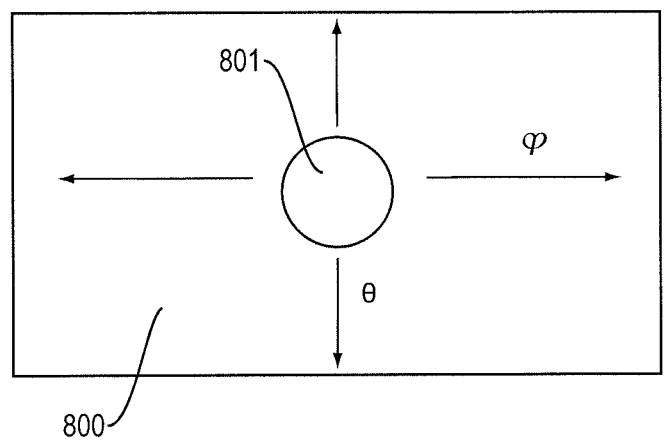
FIG. 9 Depicts an image containing a simple section of the laser beam.

The angle should be small enough to achieve that, in all operational conditions, the image 701 of the laser diode spot remains in the field of view of camera 502. Finally, laser diode 501 has a second function: the laser beam onto tag 100 is designed, for reasonable and suitably chosen angles of the tag, to reflect back onto camera 503 (CCD2). Camera 503 is not equipped by a lens, and therefore as show in FIG. 9 its image 800 contains a simple section of the laser beam 801. Once the tag is at a certain distance (measured by camera 502 through the image position 701), the position of the dot is predictable in the case of a known angle between the hand assembly and the tag surface. For any different angle, the deviation of the dot is also known. Similarly to the considerations above, the laser diode angle and the position of camera 502 are chosen to keep the reflected spot onto the active surface of camera 502

In summary, the described assembly of hand and tag is conceived to convey 6 parameters that can be generated in real time:

Position of barcode 702 in the field of view 700 of camera 502: this position can be measured as X and Y by the reconstructed 2D barcode position in the image An angle α of barcode 702, as measured by the barcode reconstruction algorithm in image 700 of camera 502.

A distance of tag 100 from hand 307, as measured by the displacement of spot 701 generated by laser diode 501 in image 700 of camera 502.

Spatial orientation in two directions φ and θ defining the tag 100 against the contact plane 307. This parallelism information is important to know if the approach trajectory of the hand against the tag 100 is perpendicular or not.

All the angular and spatial information above can be used to modulate the docking trajectory, and anticipate possible object displacements as a consequence of the modulation of the magnetic field intensity. The intensity can be obviously modulated according to the expected weight and object geometry. For example, connecting to an object that is sitting flat on a table can be guided first by the distance of tag from hand Z: when the distance Z goes beyond a certain value, the measurement of angle of barcode α provides an information on the natural angle of barcode 101. If the object is sitting horizontal by definition, then the measurement of angle of barcode α provides the primitive information on the angle with which the tag 100 is mounted on the object. The collection of information X and Y allows to reproducibly know the lateral displacement of the object with respect to the hand. Similarly, the collection of angle θ of spatial orientation in a first direction provides information of the rotation of the object with respect to the hand, while the collection of an angle φ of spatial orientation in a second direction will report gain the information on the natural angle on the mounting of the tag (its "verticality"). All this information, combined, can determine the conditions to activate the magnetic field: in some instances, applying a minimal force may allow to rotate the object in the second direction φ, to generate an approach measured along the distance Z of tag 100 from hand 307, with an XY displacement that is known, but without lifting the object in the second direction φ if the force is not strong enough to lift it. Once the object has reached a minimal distance of tag 100 from hand 307, then the hand angle can be modulated for a flat contact in the angle θ of special orientation in the first direction, after which the magnetic field can be increased to have a connection force largely exceeding the expected weight of the object and therefore creating a tight connection between hand and object.

Finally, once the object is rigidly connected to the hand through the magnetic interface device technology, its position can be continuously monitored by the measurement of the parameters Z, X, Y, Alpha, phi, theta. Any variations of any of those numbers could imply that the object has touched an obstacle, or simply a surface. This information is valuable for a sensitive manipulation of the object, for example to flush it against a side, bottom or top surface or reference pin or external object (in case the position of the tag against the object is not known a priori). Because of the resolution of the cameras through imaging, sensitive to minute changes or even vibrations, a compact hand can therefore become an extremely effective, multi-parameters continuous sensor similar to a human hand and even more sensitive to the specific tag.

The invention claimed is:

1. A method for performing flexible liquid handling processes, comprising:
sensing, by at least one arm, a magnetic presence of a consumable connector or a magnetic vector field modified by a presence of the consumable connector, said at least one arm having a magnetic interface device;
connecting said at least one arm to consumables, based on magnetic attraction utilizing said magnetic interface device;
moving said consumables by said at least one arm;
aspirating liquids from within said consumables and dispensing liquids by at least one static or quasi-static pipette, wherein the aspiration and dispensing are performed without displacement of the at least one static or quasi-static pipette; and
disconnecting said at least one arm from the consumables based on a repulsive magnetic force.

2. An apparatus for performing flexible liquid handling processes, comprising:
at least one arm to move consumables, said at least one arm having a magnetic interface device, wherein the magnetic interface device is configured to magnetically connect said at least one arm to the consumables based on magnetic attraction;
static or quasi-static pipettes configured such that aspiration of liquids from said consumables and dispensing liquid are performed without displacement of the static or quasi-static pipettes,
wherein the at least one arm is configured to sense a magnetic presence of a consumable connector or a magnetic vector field modified by a presence of the consumable connector;
wherein the magnetic interface device is configured to detach said at least one arm from the consumables based on a repulsive magnetic force.

3. The apparatus according to claim 2, wherein movement of the consumables by the at least one arm is assisted by camera imaging.

4. The apparatus according to claim 2, wherein said at least one arm is detachable for service and support purposes.

5. The apparatus according to claim 2, wherein the apparatus is installable on a biology laboratory bench.

6. The apparatus according to claim 2, wherein the magnetic attraction is modulated according to the consumables and a relative position of the consumables with respect to said at least one arm.

7. The apparatus according to claim 2, wherein the static or quasi-static pipettes are configured such that aspiration or dispensing is performable on inclined consumables for dead volume reduction.

8. The apparatus according to claim 2, wherein mixing of liquids before or after aspiration or dispensing is performed by movement of the at least one arm.

9. The apparatus according to claim 2, wherein the at least one arm includes coils, wherein said magnetic attraction is generated by said coils.

10. The apparatus according to claim 9, wherein said coils have an electro-coil and a permanent magnet.

* * * * *